United States Patent
Okada

(10) Patent No.: US 11,071,316 B2
(45) Date of Patent: Jul. 27, 2021

(54) SOUP STOCK EXTRACTION DEVICE AND SOUP STOCK EXTRACTION METHOD

(71) Applicant: ARIAKE JAPAN Co., Ltd., Tokyo (JP)

(72) Inventor: Kineo Okada, Tokyo (JP)

(73) Assignee: Ariake Japan Co., Ltd., Tokyo (JP)

( * ) Notice: Subject to any disclaimer, the term of this patent is extended or adjusted under 35 U.S.C. 154(b) by 205 days.

(21) Appl. No.: 16/076,407

(22) PCT Filed: Feb. 23, 2017

(86) PCT No.: PCT/JP2017/006827
§ 371 (c)(1),
(2) Date: Aug. 8, 2018

(87) PCT Pub. No.: WO2017/150332
PCT Pub. Date: Sep. 8, 2017

(65) Prior Publication Data
US 2019/0037894 A1    Feb. 7, 2019

(30) Foreign Application Priority Data
Mar. 3, 2016 (JP) .............................. JP2016-041483

(51) Int. Cl.
*A23L 23/00* (2016.01)
*A23P 30/00* (2016.01)

(52) U.S. Cl.
CPC .............. *A23L 23/00* (2016.08); *A23P 30/00* (2016.08); *A23V 2300/14* (2013.01)

(58) Field of Classification Search
CPC ....... A23L 23/00; A23P 30/00; A23V 2300/14
See application file for complete search history.

(56) References Cited

U.S. PATENT DOCUMENTS 1,565,282 A * 12/1925 Mabee ................... A23K 10/30
                                                        426/511
3,368,906 A *  2/1968 Coffin ..................... A23L 27/26
                                                        426/417
(Continued)

FOREIGN PATENT DOCUMENTS

| CN | 203170057 | * | 9/2013 |
| JP | S55108269 | * | 8/1980 |

(Continued)

OTHER PUBLICATIONS

English translation for JPS55108269 published Aug. 1980.*
(Continued)

*Primary Examiner* — Anthony J Weier
(74) *Attorney, Agent, or Firm* — Scully, Scott, Murphy & Presser, PC

(57) ABSTRACT

A soup stock extraction device includes a stock take-out part that is connected to a bottom of a tank containing water and ingredients used for soup stock extraction and that is used to take out a stock including flavor compounds extracted from the ingredients and dissolved in the water, and a residue discharge part for discharging a residue of the ingredients. The stock take-out part includes a tubular body that is connected to the bottom of the tank and receives the stock and the residue flowing therein from the tank in a process of stock extraction, a screw conveyor disposed inside the tubular body, and a stock take-out port provided on the tubular body to take out the stock inside the tubular body. The residue discharge part includes the screw conveyor and a residue discharge port provided on the tubular body to discharge the residue.

9 Claims, 4 Drawing Sheets

(56) References Cited

U.S. PATENT DOCUMENTS

| | | | |
|---|---|---|---|
| 7,989,011 B2 * | 8/2011 | Newkirk | ............... B30B 9/12 426/489 |
| 2006/0273047 A1 | 12/2006 | Newkirk et al. | |

FOREIGN PATENT DOCUMENTS

| | | | |
|---|---|---|---|
| JP | S58-036378 A | | 3/1983 |
| JP | S58-36379 A1 | | 3/1983 |
| JP | H08-214815 A | | 8/1996 |
| JP | H09-248161 A | | 9/1997 |
| JP | H10-258395 A | | 9/1998 |
| JP | 2000-126508 A | | 5/2000 |
| JP | 2003225503 | * | 8/2003 |
| JP | 2006-506990 A | | 3/2006 |
| JP | 2009-136199 A | | 6/2009 |
| JP | 2011-056142 A | | 3/2011 |
| KR | 2013-0102389 | * | 9/2013 |

OTHER PUBLICATIONS

English translation for CN203170057 published Sep. 2013.*
English translation for KR2013-0102389 published Sep. 2013.*
Derwent Abstract for KR560331 published Mar. 2006.*
International Search Report dated Apr. 11, 2017 issued in PCT/JP2017/006827.
Japanese Office Action dated Apr. 4, 2017 issued in JP 2016-041483.
Korean Office Action dated Oct. 15, 2019 in Korean Patent Application No. 10-2018-7023120.
English translation of International Preliminary Report on Patentability dated Sep. 13, 2018 together with the Written Opinion received in related International Application No. PCT/JP2017/006827.
Extended Supplementary European Search Report dated Sep. 10, 2019 in European Patent Application No. 17 75 9798.6.
Chinese Office Action dated Jun. 3, 2021 from related CN 201780014804.9 together with English language translation.

* cited by examiner

SOUP STOCK EXTRACTION DEVICE AND SOUP STOCK EXTRACTION METHOD

TECHNICAL FIELD

The present invention relates to a soup stock extraction device and a soup stock extraction method.

BACKGROUND ART

A soup manufacturing equipment is known, in which a tank containing stock ingredients such as chicken bones or pig bones used for soup stock extraction can be tilted (see JP H09/248161). The device disclosed in JP H09/248161 is configured that after soup stock extraction, stock and a residue of the stock ingredients can be taken out by tilting the tank using a rotating shaft.

Meanwhile, a bone broth manufacturing equipment is known, in which a net basket containing pig bones is placed in a tank to extract stock (see, e.g., JP 2009/136199). The bone broth manufacturing equipment disclosed in JP 2009/136199 is configured that after the stock is taken out through a take-out port of the tank, the net basket is hoisted out of the tank and the residue of the stock ingredients is removed from the tank.

CITATION LIST

Patent Literatures

JP H09/248161
JP 2009/136199

SUMMARY OF INVENTION

Technical Problem

In case of the equipment with a tiltable tank structure disclosed in JP H09/248161, however, if the size is increased, it is difficult to operate and working conditions of operators becomes oppressive, e.g., dangerous, tough or dirty. It is easily used to extract stock in small scale such as in a kitchen, but industrial use thereof is environmentally and economically difficult.

In case of the equipment disclosed in JP 2009/136199 which is configured to arrange a net basket in a tank, if the size is increased, it is hard work to hoist the net basket up and to dispose the residue by lateral motion. In addition, it is structurally difficult to attach a stirring device with a satisfactory stirring function inside the tank. Therefore, when the size is increased, unevenness of water temperature in the tank may occur and cause variation in quality of stock.

In addition, in any of the above-described types of equipment, high-temperature stock inside the tank is exposed to the air at least at the time of discharging the residue from the tank. Therefore, the generated steam condenses on the ceiling of the facility and falls down as contaminated water drops which contaminate the stock or floor. This is unhygienic and permission to use production equipment is not granted depending on country. There are also problems that it is dangerous for operators and temperature inside the facility cannot be maintained at a temperature specified by the regulations (e.g., not more than 8° C.). To avoid take-out or discharge of very hot stock or residue, it is necessary to wait until they cool down, but in this case, it takes time and multiplication of microorganisms is unavoidable.

As such, both of the above-described types of equipment are inefficient and uneconomical for use in industrial scale and have serious hygiene and safety problems.

It is an object of the invention to provide a soup stock extraction device and a soup stock extraction method which allow for economical, hygienic and safe soup stock production.

Solution to Problem

A soup stock extraction device described in [1] to [10] below and a soup stock extraction method described in [11] to [17] below are provided in accordance with an embodiment of the invention.

[1] A soup stock extraction device, comprising:
  a stock take-out part that is connected to a bottom of a tank containing water and ingredients used for soup stock extraction and that is used to take out a stock comprising flavor compounds extracted from the ingredients and dissolved in the water; and
  a residue discharge part for discharging a residue of the ingredients,
  wherein the stock take-out part comprises a tubular body that is connected to the bottom of the tank and receives the stock and the residue flowing therein from the tank in a process of stock extraction, a screw conveyor disposed inside the tubular body, and a stock take-out port provided on the tubular body to take out the stock inside the tubular body, and
  wherein the residue discharge part comprises the screw conveyor and a residue discharge port provided on the tubular body to discharge the residue.

[2] The soup stock extraction device defined by [1], wherein the vertical position of the stock take-out port is between the vertical positions of the upper and lower edges of a blade of the screw conveyor.

[3] The soup stock extraction device defined by [1] or [2], wherein the residue discharge port is an opening that is provided at an end portion of the tubular body on the opposite side to the tank and has an openable and closable lid.

[4] The soup stock extraction device defined by any one of [1] to [3], wherein the tubular body comprises a first part housing the blade of the screw conveyor and a second part provided under the first part and inclined with respect to the first part.

[5] The soup stock extraction device defined by any one of [1] to [4], comprising: a steam jacket that covers the surface of the tubular body.

[6] The soup stock extraction device defined by any one of [1] to [5], wherein the vertical position of the upper edge of the blade of the screw conveyor is the same as the vertical position of an opening of the tubular body at an upper end or is higher than the vertical position of the opening.

[7] A soup stock extraction device that is connected to a bottom of a tank containing water and ingredients used for soup stock extraction to take out a stock comprising flavor compounds extracted from the ingredients and dissolved in the water, the soup stock extraction device comprising:
  a tubular body that is connected to the bottom of the tank and receives the stock and a residue flowing therein from the tank in a process of stock extraction;
  a stock take-out port provided on the tubular body to take out the stock inside the tubular body; and
  a baffle plate that is placed inside the tubular body and inhibits a fall of the residue inside the tubular body to assist extraction of the stock.

[8] The soup stock extraction device defined by [7], wherein the tubular body comprises a first part housing the baffle plate, and a second part provided under the first part and inclined with respect to the first part.

[9] The soup stock extraction device defined by [7] or [8], comprising: a steam jacket that covers the surface of the tubular body.

[10] The soup stock extraction device defined by any one of [7] to [9], wherein the vertical position of the upper edge of the baffle plate is the same as the vertical position of an opening of the tubular body at an upper end or is higher than the vertical position of the opening.

[11] A soup stock extraction method for extracting flavor compounds from ingredients used for soup stock extraction, taking out a stock comprising the flavor compounds dissolved in water, and discharging a residue of the ingredients, the soup stock extraction method comprising:
 extracting the flavor compounds from the ingredients in a tank;
 taking out the stock through a stock take-out port that is attached to a tubular body connected to the bottom of the tank; and
 after taking out the stock, rotating a screw conveyor arranged inside the tubular body so that the residue deposited inside the tubular body is conveyed inside the tubular body and is discharged from a residue discharge port of the tubular body.

[12] The soup stock extraction method defined by [11], wherein the stock is taken out from the stock take-out port through a space under a blade of the screw conveyor inside the tubular body in which the residue is deposited.

[13] The soup stock extraction method defined by [11] or [12], wherein the tubular body is heated during the stock extraction process and the stock take-out process.

[14] The soup stock extraction method defined by any one of [11] to [13], wherein steam generated from water in the tank is compressed inside the tank by sealing the tank during the stock extraction process, so that extraction of the stock is accelerated by pressure of the steam.

[15] A soup stock extraction method for extracting flavor compounds from ingredients used for soup stock extraction and taking out a stock comprising the flavor compounds dissolved in water, the soup stock extraction method comprising:
 extracting the flavor compounds from the ingredients in a tank; and
 taking out the stock through a stock take-out port that is attached to a tubular body connected to the bottom of the tank,
 wherein the stock is taken out from the stock take-out port through a space under a baffle plate inhibiting a fall of the residue inside the tubular body in which the residue is deposited.

[16] The soup stock extraction method defined by [15], wherein the tubular body is heated during the stock extraction process and the stock take-out process.

[17] The soup stock extraction method defined by [15] or [16], wherein steam generated from water in the tank is compressed inside the tank by sealing the tank during the stock extraction process, so that extraction of the stock is accelerated by pressure of the steam.

Advantageous Effects of Invention

According to an embodiment of the invention, it is possible to provide a soup stock extraction device and a soup stock extraction method which allow for economical, hygienic and safe soup stock production.

DESCRIPTION OF EMBODIMENTS

Configuration of Soup Stock Extraction Device

Figure 1:
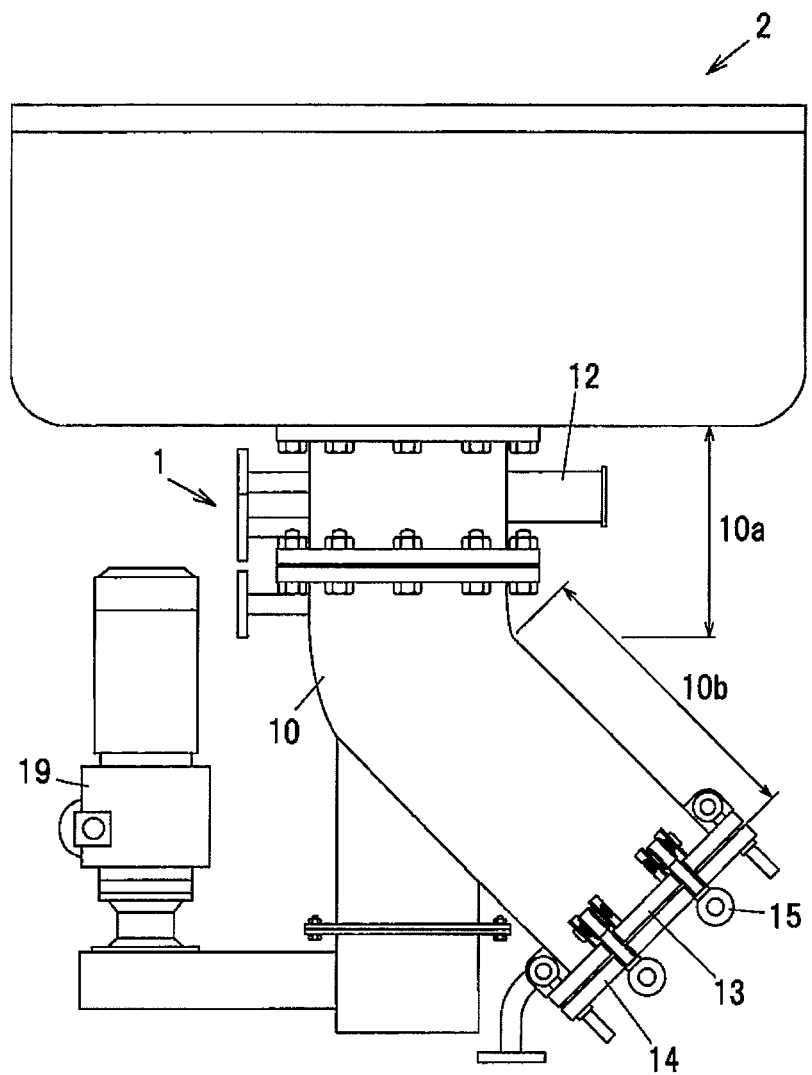
FIG. 1 is an external view showing a soup stock extraction device in an embodiment of the present invention and a tank.
Figure 2:
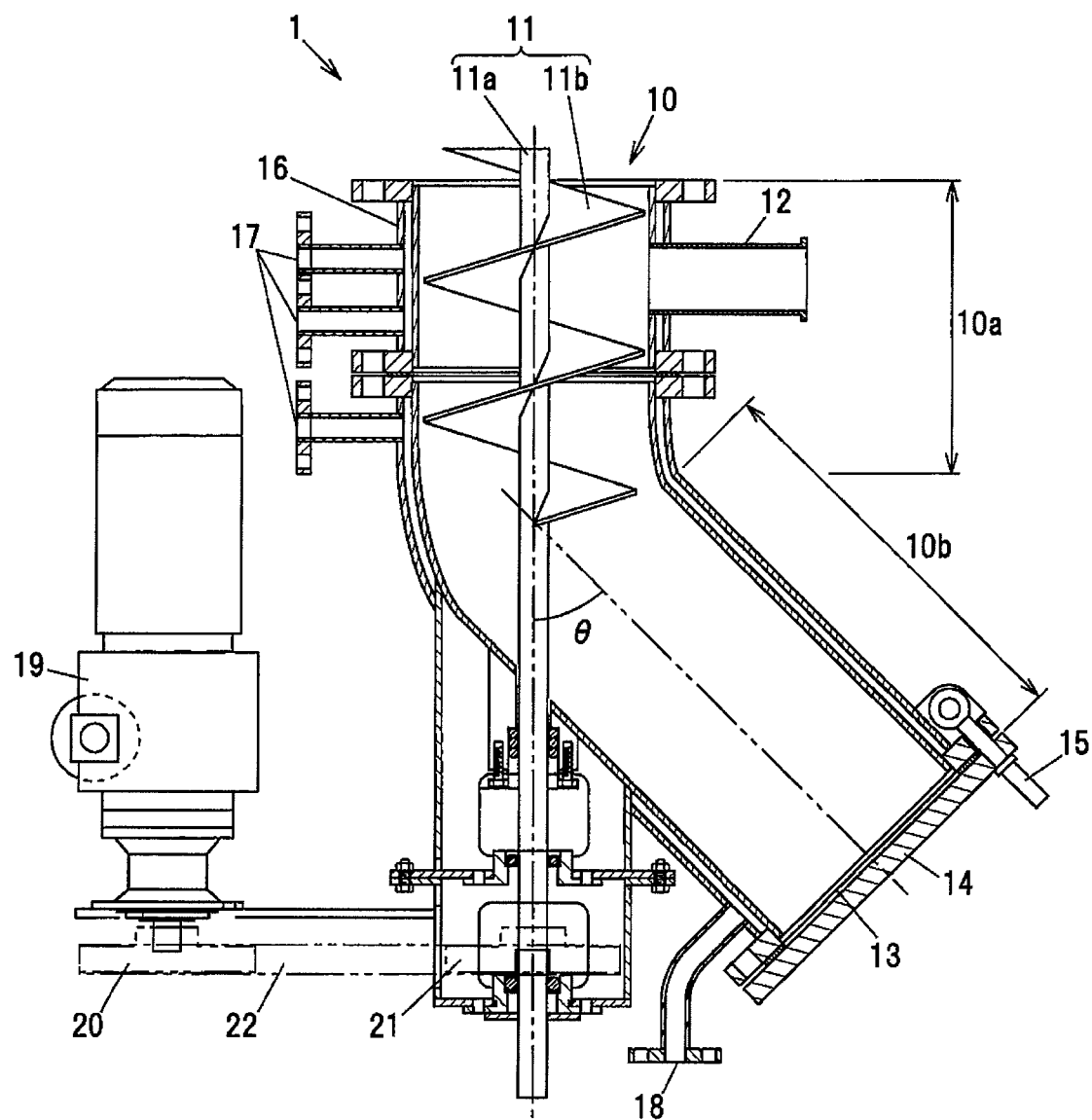
FIG. 2 is a vertical cross-sectional view showing the soup stock extraction device in the embodiment.
Figure 3:
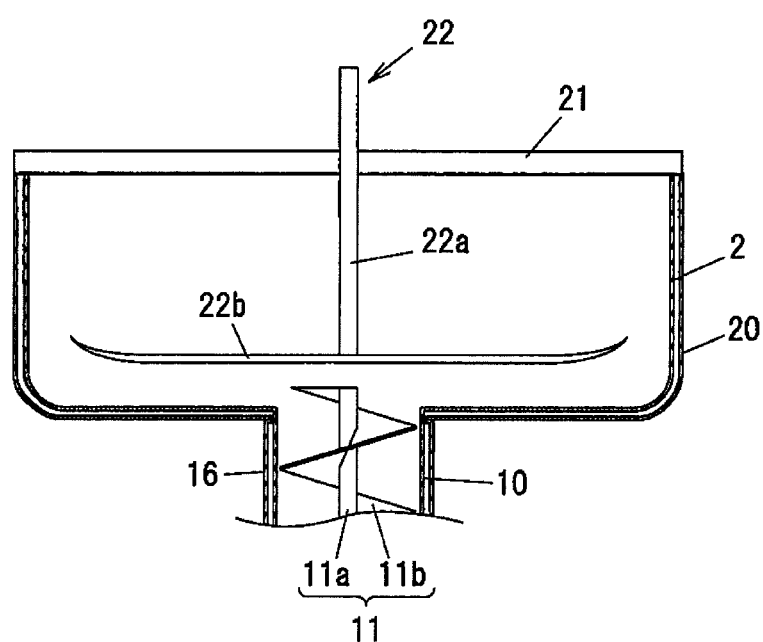
FIG. 3 is a vertical cross-sectional view showing the tank to which the soup stock extraction device is connected.

FIG. 1 is an external view showing a soup stock extraction device 1 in an embodiment of the present invention and a tank 2. FIG. 2 is a vertical cross-sectional view showing the soup stock extraction device 1 in the embodiment. FIG. 3 is a vertical cross-sectional view showing the tank 2 to which the soup stock extraction device 1 is connected.

The soup stock extraction device 1 is a device to be connected to the bottom of a tank containing water and animal bones such as pig or chicken bones used for soup stock extraction, and is capable of taking out a stock (or an extraction liquid) with flavor compounds extracted from the bones and dissolved in water and also capable of discharging a bone residue (insoluble substances which are left after soup stock extraction).

The soup stock extraction device 1 has a tubular body 10 which is connected to the bottom of the tank 2 and receives the stock and a residue flowing therein from the tank 2 during the stock extraction process, a stock take-out port 12 which is provided on the body 10 to take out the stock, a residue discharge port 13 which is provided on the body 10 to discharge the residue, and a screw conveyor 11 which is arranged within the body 10 and conveys the residue deposited in the body 10 toward the residue discharge port 13.

The screw conveyor 11 has a rotating shaft 11a, and a helical blade 11b on the rotating shaft 11a. The screw conveyor 11 has a function of assisting take-out of the stock and also has a function of assisting discharge of the residue.

Firstly, the function of the screw conveyor 11 to assist take-out of the stock will be specifically described. When taking out the stock through the stock take-out port 12, the residue which includes fine sand-shaped bone particles flows into the body 10 and is deposited. Thus, if the screw conveyor 11 is not provided, the deposited residue blocks the path from the tank 2 to the stock take-out port 12, and also, a large amount of the residue flows out from the stock take-out port 12 and causes clogging of a pipe (not shown) connected to the stock take-out port 12, hence, it is not possible to take out the stock.

On the other hand, when the screw conveyor 11 is provided, the residue is unlikely to get under the blade 11b of the screw conveyor 11 since the blade 11b serves as a baffle plate for inhibiting a fall of the residue, and a space to be a stock take-out path is formed thereunder. It is also possible to prevent the residue from flowing out from the stock take-out port 12. Thus, it is easy to take out the stock.

The stock take-out path is easily formed from the tank 2 to the stock take-out port 12 when the vertical position of the stock take-out port 12 is between the vertical positions of the upper and lower edges of the blade 11b, i.e., when the stock take-out port 12 is provided on a first part 10a of the body 10 since the blade 11b of the screw conveyor 11 forms the stock take-out path.

Particularly, a vertical distance from an opening of the body 10 at the upper end (a vertical distance from the bottom of the tank 2) is preferably as short as possible and is preferably, e.g., not more than 200 mm. This is based on the fact that the residue is likely to flow out from the stock take-out port 12 when a lower region than the stock take-out port 12 (a region on the lower side of the stock take-out port 12 in FIG. 2) is completely filled with the residue.

If a stock take-out port is attached to the bottom of the tank 2, the residue deposited on the bottom of the tank 2 becomes an obstruct and it is not possible to take out the stock.

Meanwhile, the vertical position of the upper edge of the blade 11b is preferably the same as or higher than the vertical position of the opening of the body 10 at the upper end (the vertical position of the bottom surface of the tank 2) so that a fall of the residue can be inhibited by the blade 11b of the screw conveyor 11 more effectively.

A gap between the blade 11b of the screw conveyor 11 and the inner wall of the body 10 is preferably not less than 5 mm and not more than 80 mm, and is, e.g., 5 mm. When the gap is smaller than 5 mm, the stock is less likely to flow between the blade 11b and the inner wall of the body 10. Meanwhile, when more than 80 mm, the residue is likely to flow between the blade 11b and inner wall of the body 10 and is thus likely to flow out from the stock take-out port 12.

A pitch of the blade 11b of the screw conveyor 11 is preferably not less than 100 mm and not more than 200 mm, and is, e.g., 150 mm. Take-out of the stock and discharge of the residue can be effectively assisted when the pitch is in the range of not less than 100 mm and not more than 200 mm.

When, for example, the screw conveyor 11 is not used for the residue discharge mechanism, a member other than the blade 11b of the screw conveyor 11, e.g., a helical plate having a similar shape to the blade 11b, can be used as a baffle plate for inhibiting a fall of the residue. In other words, it is possible to assist take-out of the stock also when using a baffle plate formed of a member other than the blade 11b of the screw conveyor 11.

Next, the function of the screw conveyor 11 to assist discharge of the residue will be specifically described. Without the screw conveyor 11, the residue, which is fine sand-shaped bone particles, is highly densely deposited in the body 10 due to its own weight and it is thus very difficult to discharge the residue. In addition, since stock is generally extracted by applying pressure, the deposited residue is squeezed by pressure from above and this makes the discharge more difficult.

On the other hand, when the screw conveyor 11 is provided, the blade 11b of the screw conveyor 11 serves as a baffle plate for inhibiting a fall of the residue as described above and it is thus possible to prevent high-density deposition of the residues. In addition, since it is possible to convey the residue toward the residue discharge port 13 by rotating the blade 11b at the time of discharging the residue, it is possible to easily discharge the residue.

The screw conveyor 11 is rotated by an external stirrer motor 19 installed outside the soup stock extraction device 1. Since the external stirrer motor 19 is installed outside the soup stock extraction device 1, it is possible to easily control the rotation speed of the screw conveyor 11 (a residue discharging speed) or the rotation direction.

In the example shown in FIG. 2, rotation of a sprocket 20 of the external stirrer motor 19 is transferred via a sprocket chain 22 to a sprocket 21 fixed to the rotating shaft 11a of the screw conveyor 11, and the screw conveyor 11 is thereby rotated. Although the lower edge of the rotating shaft 11a to which the sprocket 21 is attached is located outside the body 10 as shown in FIG. 2, the airtightness of the body 10 is maintained.

Since the soup stock extraction device 1 is configured that the residue is automatically discharged by the screw conveyor 11, a large amount of stock can be extracted from a large amount of bones at a time by using the tank 2 with a large capacity and can be taken out. As a result, it is possible to reduce the manufacturing cost for the soup stock.

The body 10 preferably has a first part 10a which houses the blade 11b of the screw conveyor 11, and a second part 10b which is provided on the lower side of the first part 10a and is inclined at a predetermined angle θ with respect to the rotating shaft 11a or the first part 10a, as shown in FIGS. 1 and 2.

The second part 10b can receive and hold the residue flowing down through a gap between the blade 11b of the screw conveyor 11 and the inner wall of the body 10. In addition, since the second part 10b has an inclination from the horizontal direction, compression of the residue inside the body 10 due to pressure from above can be reduced and the residue can slide down when being discharged.

The inclination angle θ of the second part 10b is preferably not less than 30° and not more than 50°. When the inclination from the horizontal direction is more than 50°, the residue is less likely to slide down along the inner wall of the second part 10b during discharge of the residue. On the other hand, when less than 30°, the capacity of the second part 10b is reduced since a portion of the rotating shaft 11a of the screw conveyor 11 housed therein is increased, and the amount of the residue to be held during soup stock extraction is reduced.

To facilitate discharge of the residue, the residue discharge port 13 is preferably an opening which is provided at an end of the body 10 on the opposite side to the tank 2 and has an openable and closable lid 14. In the example shown in FIGS. 1 and 2, the lid 14 is a pressure-resistant lid fixed by a clamp 15. Alternatively, another opening and closing mechanism such as sluice valve or ball valve may be used instead of the lid 14 to discharge the residue. The residue discharge port needs to be located below the screw conveyor 11. Therefore, even if a residue discharge port is provided on the bottom of the tank 2, the residue cannot be discharged therefrom.

In the soup stock extraction device 1, e.g., a steam jacket 16 covering the surface of the body 10 is provided as a heating device to heat the body 10. By heating the body 10, it is possible to prevent the stock from coagulating or the stock and the residue from getting rotten inside the body 10 during the stock extraction process and the stock take-out process. Steam is sent into the steam jacket 16 from steam inlet ports 17 and water produced by cooling of the steam is discharged from a water discharge port 18. Alternatively, another heating device such as electric heater may be used instead of the steam jacket 16.

The shape of the tank 2 connected to the soup stock extraction device 1 is not specifically limited, and may be either a vertical tank or a horizontal tank. In addition, the capacity of the tank 2 is not specifically limited, neither, and it is possible to use, a 10-ton tank.

FIG. 3 shows a relation between the body 10 of the soup stock extraction device 1 and the tank 2. The tank 2 has a lid 21. The tank 2 can be tightly closed by closing the lid 21 during extraction of the stock.

It is preferable that the tank 2 be also provided with a stirrer 22 therein. The stirrer 22 has a rotating shaft 22a and a stirring part 22b. Water temperature can be maintained uniform by stirring bones and water in the tank 2 using the stirrer during stock extraction and it is thereby possible to obtain the stock with uniform quality more efficiently.

Although it is possible to extract and obtain stock at ambient temperature, it is preferable to heat the tank 2 to efficiently extract the stock. A steam jacket 20 can be used for heating.

Method for Taking Out the Stock and Discharging the Residue

A method for taking out stock and discharging residue using the soup stock extraction device 1 in the present embodiment will be described below as an example.

Figure 4:
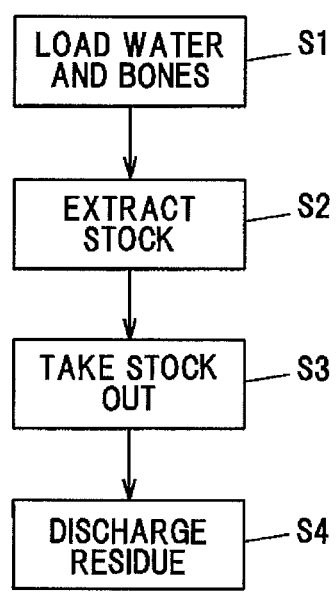
FIG. 4 is a flowchart showing a process of taking out stock and discharging a residue.

FIG. 4 is a flowchart showing a process of taking out stock and discharging residue. The method for taking out stock and discharging residue will be described below using the flowchart in FIG. 4.

Firstly, after opening the lid 21 of the tank 2, water and animal bones such as beef, pig or chicken bones are loaded into the tank 2 (Step 1). Large bones such as beef bones are loaded into the tank 2 preferably after cutting to a size according to an inner diameter of the body 10 of the soup stock extraction device 1 for efficient extraction.

The weight of water supplied to the tank 2 is generally not less than the weight of bones. The bone-to-water weight ratio is set to, e.g., 1:1.15. In general, bones are loaded after loading water.

Next, stock is extracted from the bones contained in the tank 2 (Step 2). At this stage, the tank 2 and the body 10 of the soup stock extraction device 1 are heated by supplying high-temperature steam into the steam jackets 16 and 20. By heating the tank 2, steam generated from water in the tank 2 is compressed inside the tightly-closed tank 2 and extraction of the stock is accelerated by pressure of the steam.

The bones and water are stirred predetermined number of times for a predetermined period by the stirrer 22 provided in the tank 2 every 30 to 60 minutes to promptly accelerate heat conduction, thereby obtaining stock with uniform quality. The predetermined period and the predetermined number of times here mean the stirring time and the number of stirrings not causing turbidity, and are, e.g., not less than five times and not more than ten times in not less than 30 seconds and not more than 1 minute.

Next, the stock is taken out from the stock take-out port 12 of the soup stock extraction device 1 (Step 3).

Next, after opening the lid 14 of the residue discharge port 13 of the soup stock extraction device 1, the screw conveyor 11 is activated to discharge the residue from the residue discharge port 13 (Step 4). The residue discharged from the residue discharge port 13 is conveyed by, e.g., a conveyor installed outside the soup stock extraction device 1.

Effects of the Embodiment

According to the above-described embodiment, it is possible to automatically take out a large amount of stock and discharge a large amount of residue without exposure to the outside, allowing for economical, hygienic and safe soup stock production. In other words, it is possible to solve the previously-mentioned problems. In addition, the soup stock extraction device in the embodiment does not require work by human and thus allows for full automation by aggregate production such as automatic control using a computer.

Although the embodiment of the invention has been described, the invention is not intended to be limited to the embodiment, and the various kinds of modifications can be implemented without departing from the gist of the invention.

In addition, the invention according to claims is not to be limited to the embodiment described above. Further, it should be noted that all combinations of the features described in the embodiment are not necessary to solve the problem of the invention.

REFERENCE SIGNS LIST

1 SOUP STOCK EXTRACTION DEVICE
2 TANK
10 BODY
10a FIRST PART
10b SECOND PART
11 SCREW CONVEYOR
11a ROTATING SHAFT
11b BLADE
12 STOCK TAKE-OUT PORT
13 RESIDUE DISCHARGE PORT
14 LID

The invention claimed is:

1. A soup stock extraction device that is configured to be connected to a bottom of a tank containing water and ingredients used for soup stock extraction, comprising:
   a tubular body configured to be connected to the bottom of the tank;
   a screw conveyor or a helical plate disposed inside the tubular body;
   a stock take-out port disposed on a sidewall of the body;
   a residue discharge part provided on a bottom of the tubular body for discharging a residue of the ingredients,
   wherein
   a blade of the screw conveyor or the helical plate is configured to deposit the residue thereon to inhibit a fall of the residue, and
   wherein the stock take-out port is configured to take out a stock from the body through a space between plural ones of the blade of the screw conveyor or the helical plate inside the body by inhibiting the fall of the residue by the blade of the screw conveyor or the helical plate.

2. The soup stock extraction device according to claim 1, wherein a vertical position of the stock take-out port is between the vertical positions of the upper and lower edges of the blade of the screw conveyor or the helical plate.

3. The soup stock extraction device according to claim 1, wherein the residue discharge part comprises an opening comprising an openable and closable lid.

4. The soup stock extraction device according to claim 1, wherein the tubular body comprises a first part housing a blade of the screw conveyor or the helical plate and a second part provided under the first part and inclined with respect to the first part.

5. The soup stock extraction device according to claim 1, comprising a steam jacket that covers a surface of the tubular body.

6. The soup stock extraction device according to claim 1, wherein a vertical position of an upper edge of a blade of the screw conveyor or the helical plate is the same as a vertical position of an opening of the tubular body at an upper end or is higher than the vertical position of the opening.

7. A soup stock extraction method for extracting flavor compounds from ingredients used for soup stock extraction, taking out a stock comprising the flavor compounds dissolved in water, and discharging a residue of the ingredients, the soup stock extraction method comprising:
    extracting the flavor compounds from the ingredients contained in a tank; and
    taking out the stock through a stock take-out port that is attached to a tubular body configured to be connected to a bottom of the tank and a space between plural ones of a blade of the screw conveyor or the helical plate inside the body by inhibiting a fall of a residue of the ingredients by depositing the residue on the blade of the screw conveyor or the helical plate.

8. The soup stock extraction method according to claim 7, wherein the tubular body is heated during the extracting of the flavor compounds and the taking out of the stock.

9. The soup stock extraction method according to claim 7, wherein steam generated from water in the tank is compressed inside the tank by sealing the tank during the extracting of the flavor compounds, so that the extracting of the flavor compounds is accelerated by pressure of the steam.

\* \* \* \* \*